Patented Nov. 30, 1948

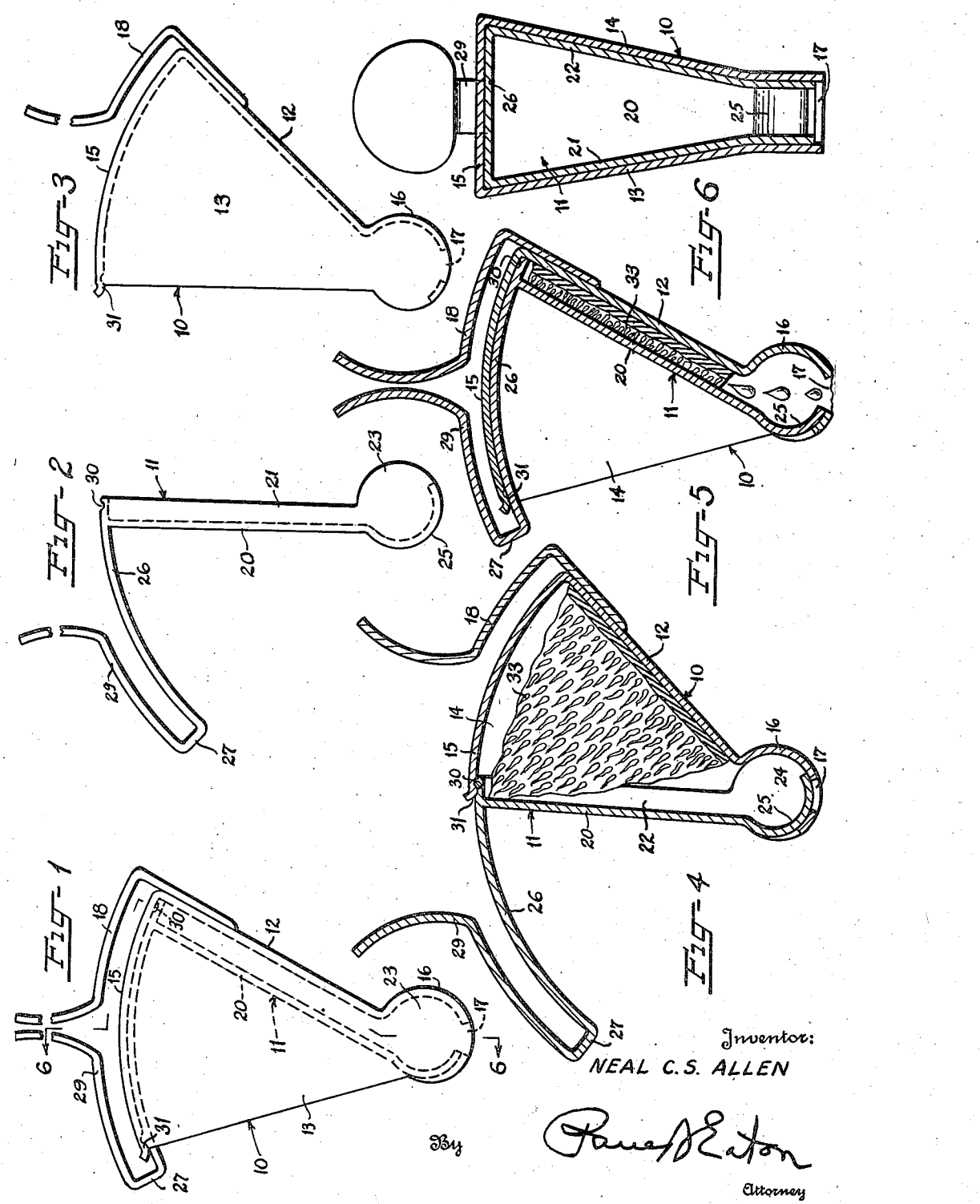

2,454,905

UNITED STATES PATENT OFFICE 2,454,905

FRUIT JUICE EXTRACTOR

Neal C. S. Allen, Bennington, Vt.

Application April 15, 1946, Serial No. 662,388

4 Claims. (Cl. 100—41)

This invention relates to a fruit juice extractor and more especially to an apparatus for use at tables in dining rooms and drink fountains and the like, whereby a small piece of fruit, such as an orange, lemon and the like can be inserted into the extractor and the two portions thereof moved together to extract the juice therefrom, and thus preventing the juice from flowing or squirting onto the fingers of the diner and also preventing it squirting onto the body and clothing of the diner in that it comprises two members hinged together at their lower ends, and adapted to receive a piece of fruit therebetween, each of said members having a handle on its end remote from the pivoted ends for pressing the two parts of the apparatus together to extract the juice from the piece of fruit held between the two parts. This application is an improvement over the structure, shown in application of Christian M. Boesser, Serial No. 563,170, filed November 13, 1944, and of which I am the assignee.

It is an object of this invention to provide a juice extractor for pieces of fruit, which is constructed from cup shaped members pivoted together at their lower ends, and having handles at their upper ends and having overlapping or telescopic portions, and between which a piece of fruit may be placed, so that when the two pieces of the apparatus are moved towards each other, the juice will be forced from the piece of fruit and allowed to flow downwardly out of an opening in the bottom of the apparatus, which opening is normally closed, when the two parts of the apparatus are spread apart from each other, but which is adapted to be opened by the movement of the two parts towards each other on their pivot and through said opening the extracted juice may flow to the desired point.

It is another object of this invention to provide a cup shaped member, having an end wall and two side walls and having a handle on its upper end, and a second member having a wall portion, and whose lower end is pivotally secured within a curved portion of the first member and the second portion having a handle member so that the two members can be spread apart from each other on their pivot to permit introduction of a piece of fruit, and said two members can then be pressed towards each other to extract the juice from a piece of fruit and in being pressed towards each other forming an opening in the bottom of the members whereby this juice may flow out of said opening into a glass, cup and the like, as is desired.

Some of the objects of the invention having been stated, other objects will appear as the description proceeds, when taken in connection with the accompanying drawings, in which:

Figure 1 is a side elevation of the apparatus and showing it in folded position;

Figure 2 is a view of the left hand part of the apparatus disassociated from its right hand part;

Figure 3 is a side elevation of the right hand part of the apparatus disassociated from the left hand part;

Figure 4 is a vertical sectional view through Figure 1 and showing the parts in the position they will occupy after a piece of fruit has been inserted between the two movable parts and they have been partially moved towards closed position;

Figure 5 is a view similar to Figure 4, but showing the parts in fully compressed position, that is, moved together to extract the juice from the piece of fruit held therebetween;

Figure 6 is a vertical sectional view taken substantially along the line 6—6 in Figure 1.

Referring more specifically to the drawings, the numeral 10 indicates one of the parts of the apparatus, while 11 indicates the other part. The portion 10 has an end wall 12 and side walls 13 and 14 and a top wall 15. The lower end of the end wall 12 is formed into the arc of a circle, as at 16, and has an opening 17 in its lower portion. It also has a handle member 18 secured on the outside surface of the end wall 12 and projecting upwardly and inwardly over the top wall 15. The member 11 has an end wall 20 and side walls 21 and 22 merging into substantially circular portions 23 and 24 and the end wall is formed into a semi-circular portion 25. End wall 20 has an outwardly projecting curved portion 26, which extends upwardly, as at 27, and then inwardly forming a handle portion 29 for cooperating with handle 18 for moving the two portions 10 and 11 towards each other, that is, to cause the end walls 20 and 12 to be moved towards each other.

In the top portion 26 is a cavity 30, into which a projection or detent 31 on the top wall 15 is adapted to fit to act as a detent to prevent the two parts 10 and 11 from becoming entirely separated from each other, but which by a slight additional force can cause the detent 31 to be lifted out of the cavity 30 to completely open up the apparatus for the insertion of a piece of fruit between the two pieces. A piece of fruit, such as citrus fruit and the like, is indicated at 33 in Figure 4 before compression is applied, and in Figure 5, this piece of fruit is shown after the juice has been extracted therefrom.

With the parts 10 and 11 in the position shown in Figure 4, it is seen that the opening 17 in portion 16 is closed by the semi-circular portion 25, whereas, when the parts are moved to the position, shown in Figure 5, the portion 25 moves from over the opening 17, and the extracted juice is allowed to flow out through the opening 17 into a desired vessel where it is to be used; or onto articles of food on a plate.

In the drawings and specification, there has been set forth a preferred embodiment of the invention, and although specific terms are employed, they are used in a generic and descriptive sense only and not for purposes of limitation, the scope of the invention being defined in the claims.

I claim:

1. A fruit juice extractor comprising a pair of members pivotally secured to each other at their lower portions for hinged movement on a pivot axis and each having an end wall, a pair of side walls, and a top wall, the top wall of each section being arcuate and the side walls and top wall of one member being adapted to telescope with relation to the side walls and top wall of the other member, when the two members are moved towards each other on their pivot axis, said members having arcuate portions on their lower ends, the arcuate portion of one member telescoping with relation to the arcuate portion of the other member, and rotatably mounted therein, the outer arcuate portion having a hole therein, which is normally closed by the arcuate portion on the lower end of the other member, when the parts are in open position, and which is adapted to be opened when the two parts are pressed towards each other into telescopic relation to allow fruit juice extracted from a piece of fruit disposed between the two members to flow out through said hole.

2. A fruit juice extractor comprising a pair of members pivotally secured to each other at their lower portions for hinged movement on a pivot axis and each member having an end wall and two side walls and a top wall, the top wall of each member being arcuate in cross section, the side walls and top wall of one member being adapted to telescope with relation to the side walls and top wall of the other member, when the two members are moved towards each other on their pivot axis, the lower ends of the end walls being arcuate in cross section and of different radii, and the arcuate section on the lower end of the outer member having a hole therethrough, which is normally covered by the arcuate section of the other member, when the parts are in extended position, and when the members are moved towards each other on their pivot axis, the arcuate portion on the inner member moving from over the hole in the arcuate portion on the outer member to thus allow extracted fruit juice to pass out of the apparatus through said hole in the outer arcuate portion.

3. In a juice extractor, a pair of members hinged together at one end for movement on a pivot axis and having handles at the other ends, one of said members having a top wall, end walls and two side walls, the other member having an end wall and a top wall, the top and end walls of said other member being adapted to telescope relative to the top and side walls of said one of said members when they are moved toward each other to compress a piece of fruit disposed between the two members; the end wall of one of the members having a semi-circular portion on its lower end provided with a hole, the other member having a semi-circular portion on its lower end of smaller radius than the first semi-circular member and fitting on the inside of the first semi-circular member and closing the hole therein when the two members are swung apart from each other.

4. In a juice extractor, a pair of members hinged together at one end for movement on a pivot axis and having handles at their other ends, each of said members having a top wall and an end wall, the top wall of one member being adapted to telescope relative to the top wall of the other member when they are moved toward each other to compress a piece of fruit disposed between the two members, the lower ends of said members adjacent said pivot axis having arcuate telescoping portions adapted to occupy a telescopic relation to each other, the outer arcuate portion having a hole therein which is covered by the arcuate portion on the other member when the free ends of the members are swung apart and which is uncovered when the free ends of the two members are moved towards each other.

NEAL C. S. ALLEN.

REFERENCES CITED

The following references are of record in the file of this patent:

UNITED STATES PATENTS

| Number | Name | Date |
|---|---|---|
| 971,573 | Symonds et al. | Oct. 4, 1910 |
| 995,286 | Pender | June 13, 1911 |

FOREIGN PATENTS

| Number | Country | Date |
|---|---|---|
| 68,639 | Switzerland | July 1, 1915 |